United States Patent [19]

Auspelmyer

[11] Patent Number: 4,925,249
[45] Date of Patent: May 15, 1990

[54] AUTOMOBILE HUB MOUNT

[76] Inventor: Wilfred C. Auspelmyer, Youngs Corners Rd., R.D. #1, Box 126, Amsterdam, N.Y. 12010

[21] Appl. No.: 338,153

[22] Filed: Apr. 14, 1989

[51] Int. Cl.⁵ .............................................. B60B 3/14
[52] U.S. Cl. .................................... 301/111; 301/114; 301/9 DN
[58] Field of Search .................... 301/1, 111, 112, 115, 301/118-122, 124 R, 9 DN, 5 R, 114, 105 R

*Primary Examiner*—Russell D. Stormer
*Attorney, Agent, or Firm*—Schmeiser, Morelle & Watts

[57] ABSTRACT

A wheel mounting and dismounting mechanism for allowing a driver to easily mount and dismount a wheel to the axle of a vehicle. A hub is mounted to the end of a vehicular axle and consists of concentric mounting of several lug studs with a central gear driven mechanism consisting of gear-driven locking arms that are concentrically mounted about the central drive gear and are radially aligned with the lug studs. At the end of each such arm is hook-shaped formation which, when the arm(s) are driven in the proper direction by the central gear, engage the lug studs in the fashion of an ordinary hook sliding over a post or stud. The normal embodiment of the invention contemplates the positioning of the wheel rim over the lug studs, in normal wheel-mounting fasion and subsequent actuation of the central drive-gear mechanism so as to rotate the locking arms into the hook-over-stud position. Other intricacies of the invention assure that once the hooks are positioned about the studs, the interposed wheel rim will be firmly locked to the main axle hub.

20 Claims, 4 Drawing Sheets

AUTOMOBILE HUB MOUNT

BACKGROUND OF THE INVENTION

The present invention relates generally to improved mounting and dismounting of wheels from vehicles. More particularly it relates to a means for rapid and reliable mounting and dismounting of wheels and also relates to the hub mount which makes this possible.

It is well recognized that the way in which wheels are mounted to and dismounted from automobiles has not changed in many years. Further it is recognized that the prevalent means and method are awkward and unreliable. For example, to change a tire using the prevalent means and method available today requires that a set of lug nuts be removed from a set of hub lugs extending out from a hub plate mounted to the end of an automobile axle. The hub lugs are each characterized by a set of external threads on which the lug nuts are threaded to hold the wheel in place. The removal of the lugs from these threads is a difficult task and considerable force must be applied to a lug wrench to first loosen the nuts and before they can be removed. When the wrench slips damage can be done to the threads. Mechanics often tighten these lug nuts to a degree which makes it difficult to loosen them at road side when changing a tire in an emergency.

Further, after the lug bolts have been removed the wheel itself must be removed over the same threads. The chance for damage to the threads both during the removal of a wheel with a flat tire and also during the remounting of the wheel after the flat tire has been repaired or replaced is appreciable. This is particularly so when the flat tire occurs at some remote spot where no mechanic is available, and the person removing the wheel with the flat tire replaces it with a wheel with a spare tire. The difficulty of lifting the tire in a crouched position at a roadside puts a strain not only on the unfortunate driver but also on the equipment, and particularly on the threads of the lug nuts.

Numerous attempts have been made to deal with problems associated with the ease and efficiency of mounting and dismounting wheels from vehicles. Among the patents which have been issued which deal with this and closely related subjects are the following: U.S. Pat. Nos. 654,472; 514,348; 4,043,685; 258,557; 4,776,640. However none of these patents present a solution to the problem of rapid and reliable mounting and dismounting of wheels which is comparable to the method and mechanism which is presented herewith.

For these and other reasons it would be highly desirable to provide an auto hub mechanism which did not involve the exposure of threads of the mechanism to the tools and wheels which must be employed in changing tires and most often in changing wheels.

In addition a problem arises from the fact that the lug nuts are separated from the hub lugs during the changing procedure. There is often a danger of misplacing the lug nuts or of getting them contaminated with sand or grit which is so frequently encountered at roadside when changing a tire. When the sand or grit gets in the lug nuts it interferes with the remounting of the lug nuts on the hub lugs and this adds to the difficulty and aggravation of the person changing the tire.

In addition each lug nut must be dealt with individually and all four or five must be individually removed and individually replaced. The difficulty of starting the threading of each lug nut, and particularly of the first one while the tire is being perilously balanced to avoid bruised or scraped fingers or hands is a difficulty which is all too familiar to drivers who have had to change tires at roadside. For younger drivers, women drivers and older drivers who lack the needed strength and agility of a skilled mechanic the danger of injury while changing a tire is greater.

One more desirable feature of a hub system for an automobile is that of being able to change the tire more quickly and reliably. It is not a pleasant experience to have to spend time in the night at some remote spot in going through all of the steps presently required to change a tire.

BRIEF STATEMENT OF THE INVENTION

It is accordingly one object of the present invention to provide a mechanism which makes it simpler and easier for a driver to change a tire at roadside by replacement of the wheel.

A further object is to provide a mechanism which makes the changing of wheels in a shop or garage easier and more reliable.

Another object is to increase the pace at which a wheel can be changed.

Another object is to reduce the chance of injury to the changer when a wheel must be changed at roadside.

Another object is to make it easier for someone of lesser strength to change a wheel when the need arises.

Other objects will be in part apparent and in part pointed out in the detailed description which follows.

In one of its broader aspects the objects of the present invention can be accomplished by providing a mechanism for rapid mounting and dismounting of a wheel, to and from an axle. The mechanism comprises a hub adapted to be mounted to the end of said axle. The hub mechanism comprises a first larger hub plate having a center opening and an inner and outer face; a second smaller circular hub plate mounted to the outer face of the first plate and having a center opening concentric with that of the first hub plate; gearing mechanism mounted on an outer face of the second hub plate; and a mounting means such as a sleeve attached to the inner face of said first hub plate.

Such a sleeve may be adapted to be slidingly engaged with and anchored to an axle end so as to rotatably support the hub plates and gear mechanism from the axle end.

The first hub plate has a plurality of uniformly spaced, internally threaded hub studs anchored in an outer hub portion of the outer face of an outer hub portion of the first hub plate.

Each of the hub studs has a socket head cap bolt threadably engaged therein.

Each such socket head cap bolt has a thread at one end, an enlarged outer socket containing head at the other end. A narrowed mid section between the two ends is adapted to receive a locking C clamp of a locking arm.

The gear mechanism on the outer face of the second hub plate comprises a central drive gear and a plurality of end geared locking arms adapted to be extended and to be retracted in response to motion of the central drive gear.

Each such locking arm is pivotally mounted to the second hub plate; is geared at its inner end to mesh with the central drive gear; has a C clamp locking means formed at its extendable outer end; and has a profile in its retracted position which fits within that of the second hub plate.

The central drive gear is mounted by a socket head pin for rotation in the center opening of the second hub plate whereby rotation of a tool in the socket causes rotation of the drive gear and pivoting, in turn, of the plurality of locking arms into their extended or into their retracted positions.

The gearing mechanism, in its retracted position, is adapted to receive and cooperate with a wheel plate having a plurality of spaced openings corresponding, in numbers and spacing, to the socket head cap lock bolts threadably engaged in the hub studs. Accordingly a wheel plate mounted on the hub may be secured thereto by pivoting of the locking arms to bring the C clamps into engagement with the mid-section of the lock bolts, and by clamping the C clamps into place by tightening the individual socket heads of the lock bolts onto the C clamps.

Thus the present wheel mounting mechanism relies on a combination of retractable locking arms and on bolts which anchor the locking arms in their extended position.

BRIEF DESCRIPTION OF THE DRAWINGS

The explanation which follows will be understood with greater clarity if reference is made to the accompanying drawings in which.

DETAILED DESCRIPTION OF THE INVENTION

One of the features of the present invention is that it provides a mechanism by which the wheel of a car can be changed without exposing any threads of bolts or the like. In practicing the invention there are no lug nuts to be taken off (and perhaps to be misplaced) and none to be put back on after the wheel has been replaced. The way in which this is accomplished is now explained.

First of all the elements, and specifically socket head lock bolts, which are turned to loosen or to tighten a wheel into place are only partially removed and they need never be completely removed. Secondly the clasping and unclasping of the wheel at four separate sites is done by turning a single center gear to activate a plurality, four in the case illustrated, of locking arms which actually hold the wheel in place. So now the inventive mechanism is described with specific reference to the figures.

Figure 4:
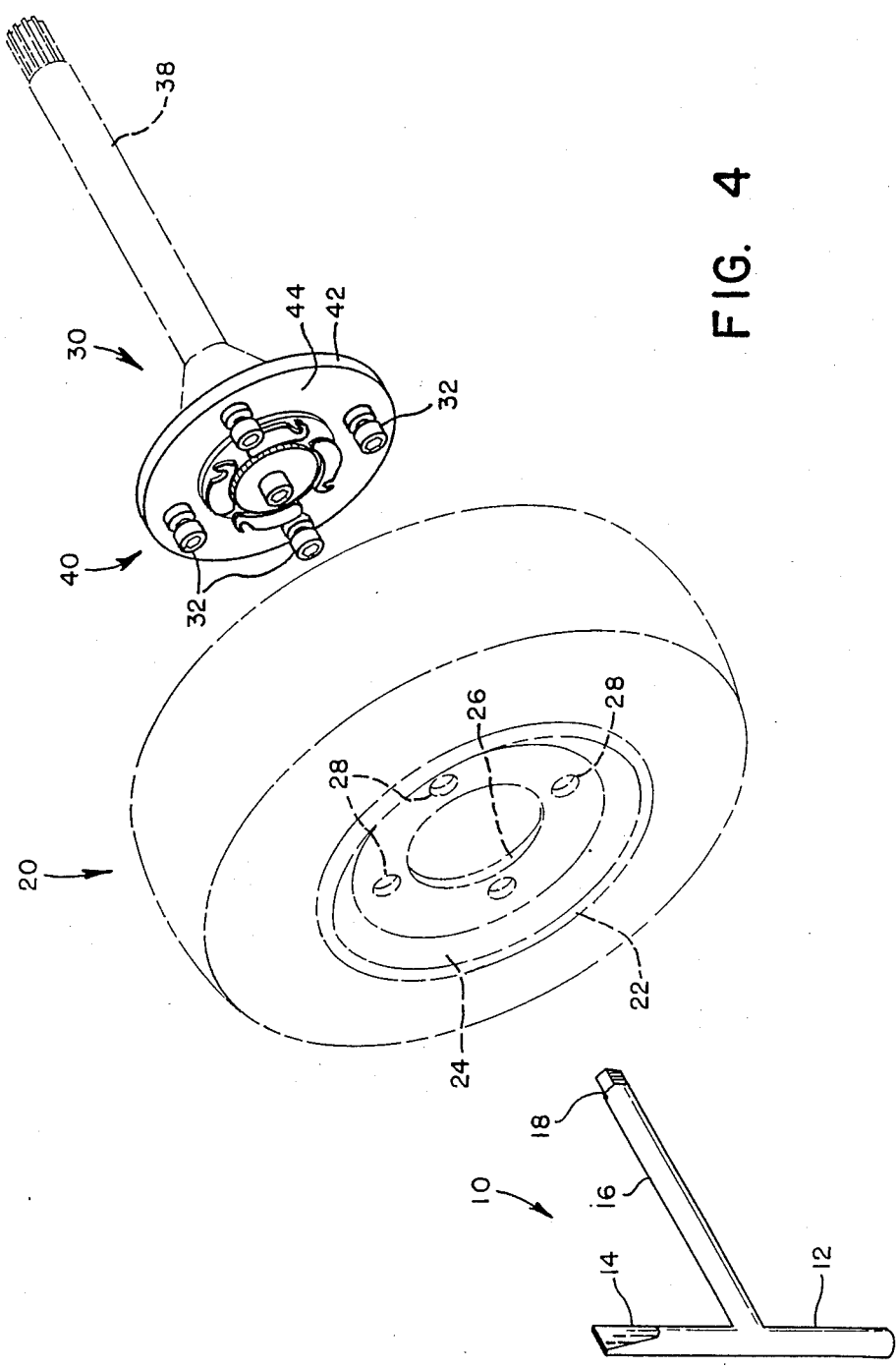
FIG. 4 is a perspective view of the relationship between a wheel, shown in phantom in the Figure, and the mechanism of the present invention as mounted for rotation on an axle.

Referring now first to FIG. 4, a perspective view of an automobile wheel is provided in phantom relative to a hub as mounted at the end of an axle. The mechanism is described here principally in relation to an automobile usage but it will be realized that the mechanism is suitable for many different applications in rapidly mounting and dismounting a wheel to and from the axle or shaft of any vehicle or other similar structure.

In the FIG. 4 a tool 10 is illustrated at the left, a wheel and tire 20 is illustrated in phantom at the center, and a hub mechanism 30 is illustrated at the right of the figure. The tool 10 is referred to as a T tool as it has the shape of the letter T. A cross handle 12 is provided for a hand grip. An end wedge 14 of handle 12 aids in removing a hub cap from the rim of a wheel. A shaft 16 delivers the torque developed by hand manipulation of the handle 12 to the tool bit 18 and in turn to the socket head of a bolt such as 32.

A wheel 20 has an outer tire, shown in phantom, and has an inner rim 22, a wheel plate 24, a center opening 26 in the wheel plate 24, and a plurality of equally spaced lug bolt openings 28.

The hub mechanism 30 of this invention is seen in FIG. 4 in its relation to a wheel 20 and to the T tool 10, which tool is used to release and to secure the mechanism. When the wheel 20 is mounted on the hub mechanism 30, each of the plurality of equally spaced lug bolts 32 passes through a conforming opening 28 in the wheel plate 24. The center opening 26 of plate 24 has a diameter just slightly larger than that of inner plate 34 of the hub mechanism 30 so that the openings 26 and 28 in wheel plate 24 permit it to be mounted directly against the outer surface 44 of plate 42.

Figure 1:
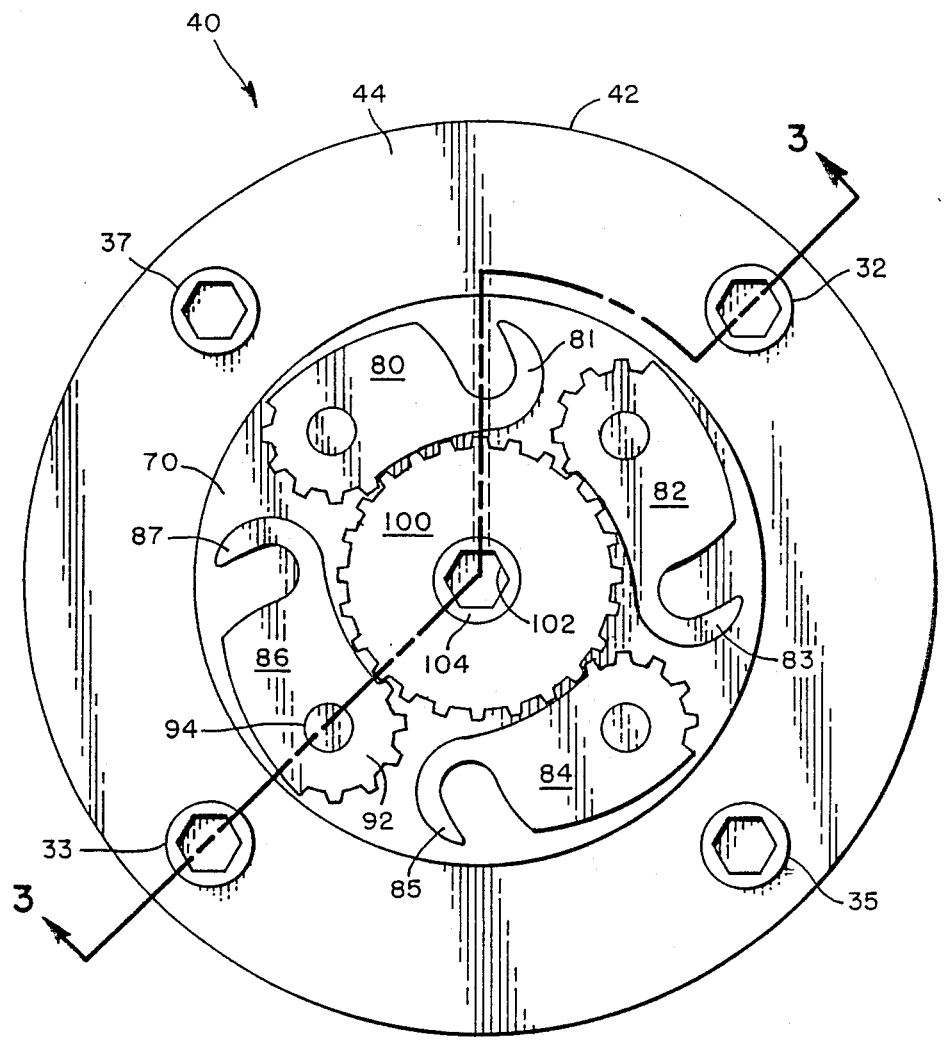
FIG. 1 is a front elevation of the mechanism of the present invention showing the gripping arms in a retracted position.

Once the wheel plate 24 is mounted against the outer surface 44 of plate 42 the mechanism of the present invention can be activated. For a more detailed description of this mechanism we turn now to FIG. 1. FIG. 1 is a front elevational view of the face 40 of the mechanism 30 as depicted in FIG. 4.

Figure 3:
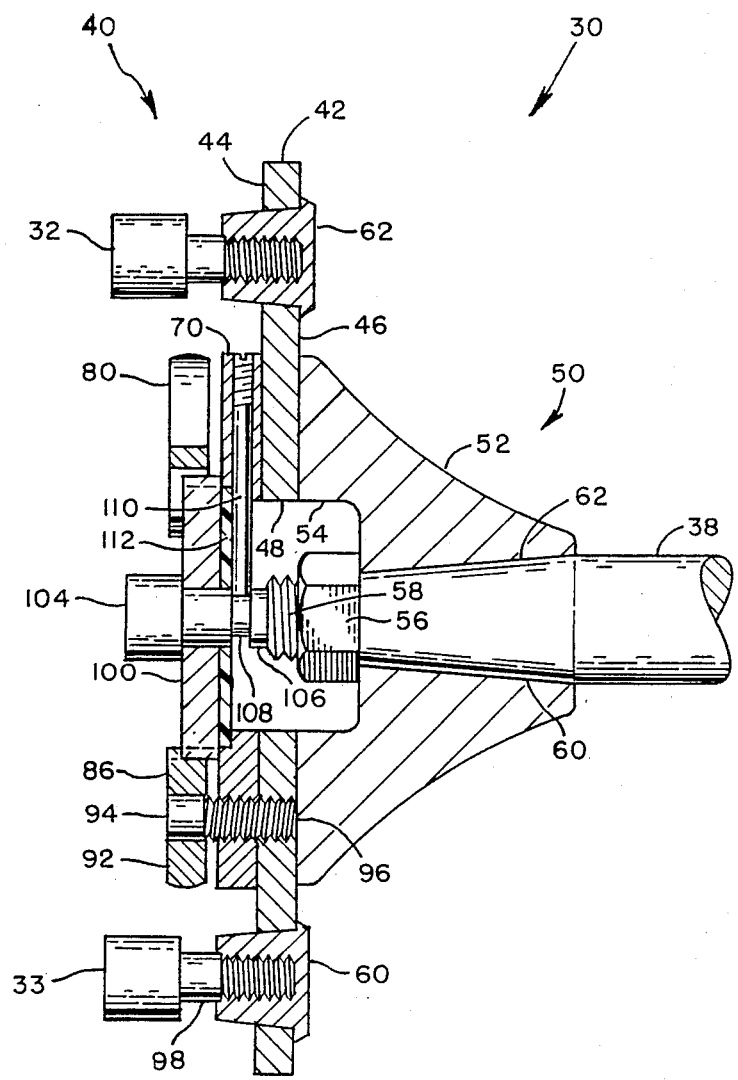
FIG. 3 is a sectional view of the mechanism of the present invention taken along the broken line 3—3 of FIG. 1.

The face 40 of the mechanism has a first and outer plate 42 attached to a mounting sleeve assembly 50 best seen in FIG. 3. The sleeve assembly is not critical to the present invention but may be replaced by any reliable means for mounting the hub mechanism as described herein to an axle or shaft for rotation therewith. The sleeve assembly includes a generally conical sleeve member 52 which is attached to the inner face 46 of plate 42. The sleeve assembly 50 also includes a countersunk recess 54 which, as depicted in FIG. 3, conforms dimensionally to a center opening 48 in plate 42. Within the recess 54 a mounting nut 56 is threaded onto a threaded bolt 58 formed integrally with and as a part of the shaft 38 at the end thereof. The shaft 38 has a tapered end 60 and the mounting sleeve assembly 50 has an inner surface 62 which has a taper which matches that of the shaft 38. So much for a structure suitable for mounting to the inner face 46 of first plate 42.

Next we consider the structure mounted in plate 42 and to its outer face 44. As is evident from FIGS. 1 and 3 the outer portion of the first hub plate 42 has a plurality of evenly spaced lug nuts mounted and anchored in and through the outer portion of the plate 42, two of which, 60 and 62, are evident in FIG. 3. A set of socket head cap bolts 32, 33, 35 and 37, best seen in FIG. 1, are threaded into the four evenly spaced lug nuts, two of which, 60 and 62 are evident in FIG. 3. These socket head cap bolts are the bolts which pass through the conforming openings 28 in the wheel plate 24 of the wheel 20 in a first step in securing the wheel onto the hub structure 40 as depicted in FIG. 4 and as explained above.

Returning now to FIGS. 1 and 3, a second and smaller hub plate 70 is attached to the first hub plate with their centers concentric to each other. The structure and function of the second hub plate is now described. First of all the diameter of the second hub plate is slightly smaller than the inner diameter of the opening 26 in the wheel plate 24 of FIG. 4.

The reason is that the opening 26 must fit over the plate 70 so that the plate 70 just fills the opening 24. In other words, as explained above, the back of wheel plate 24 abuts against the outer face 44 of first hub plate 42 as this plate is displayed in FIGS. 3 and 4. In effect this contact of the wheel plate 24 with hub plate 42 amounts to mounting the tire onto the hub. In order to lock the wheel plate 24 in place on hub 40 a mechanism is provided involving locking arms as is now described.

With reference again to FIGS. 1 and 3, a set of four locking arms 80, 82, 84 and 86 are mounted to the smaller hub plate 70 for pivoting thereon. The pivoting moves the arms from the retracted position shown in FIG. 1 to the extended position shown in FIG. 2. The pivoting of all four arms occurs simultaneously when the center gear 90 is turned a fraction of a turn. In the case of a gear ratio of four to one the full pivoting of the locking arms from their retracted position to their extended position is accomplished by about one quarter turn of the central drive gear 90. The locking arms also make about a one quarter turn in going from the retracted position of FIG. 1 to the extended position of FIG. 2.

The pivoting of the locking arms, such as arm 86 of FIG. 3, is accomplished by applying a turning force to the geared end, such as 92 of the arm 86, so that the arm pivots about a pivot pin, such as pin 94. A pin, such as 94, may be a simple pivot pin anchored in the second hub plate 70 to permit pivoting of an arm, such as 86, thereabout. Alternatively the pin may be threaded as illustrated in FIG. 3 to permit the arm to move out slightly from the plate 70 as the pivoting takes place. In the case of the mechanism of FIG. 3 the thread 96 is a left hand thread so that as the locking arm 86 makes one quarter turn to the left in going from the retracted to the extended position, as the arm itself moves down closer to the second hub plate 70. Such downward movement adds to the locking action of the locking arms. Conversely when the arm 86 is retracted by being turned one quarter turn to the right the arm moves out slightly from the surface of the second hub plate 70. This movement in and out from the surface of the plate 70 occurs for all four arms as they are moved from the retracted to the extended position or vice versa. The slight separation of the arms 80 and 86 from the second hub plate 70 is evident in the representation of these arms in FIG. 3.

Each of the locking arms has a C clamp formed integrally at the end of the arm opposite the geared end. The pivoting of the locking arms into their extended positions also brings the C clams into clamping position with respect to their respective socket head cap bolts. Thus the C clamps 81, 83, 85 and 87 clamp onto the bolts 80, 82, 84 and 86 respectively. The clamping occurs at the undercut midsection of the bolt as for example at the midsection 98 of bolt 33 of FIG. 3. The C clamp 87 of locking arm 86 clasps the midsection 98 of bolt 33 to anchor wheel plate 24 into place in contact with face 44 of hub plate 42.

Once the C clamp has clasped the wheel plate 24 in place the socket head cap bolts, such as 33, can be turned to thread the bolt into the lug nuts, such as 60, to lock the arms, such as 86, into its extended position and to prevent the retraction of the arm. Accordingly it is evident that there is a dual action which keeps the wheel plate in place on the hub of the present invention. The first action is the extension of the locking arms to capture the wheel plate in place against the first hub plate 42. The second action is the securing of the arms in place by the turning action of the socket head cap bolts.

Figure 2:
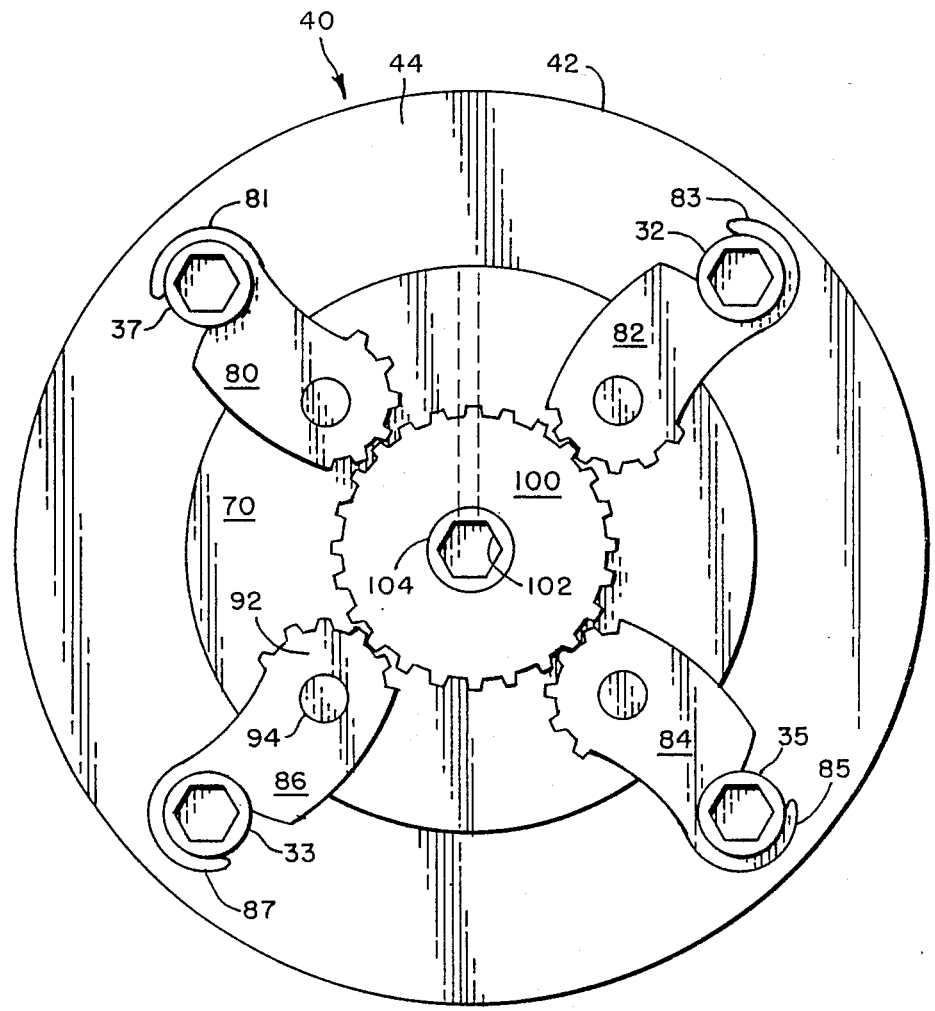
FIG. 2 is a front elevation similar to that of FIG. 1 but showing the gripping arms in an extended position.

The simultaneous activation of all four of the locking arms is accomplished by manual activation of the center drive gear 100. The gear moves responsive to the turning of a tool such as tool 10 of FIG. 4 when the tool bit 18 is inserted into the socket 102 of the socket head bolt 104. The turning of the handle 12 of the tool causes the socket head pin 104 and the central gear 100, in which the pin 104 is anchored, to turn and to deliver turning force to the geared ends, such as end 92 of arm 86, to cause the arms to pivot into their extended positions as illustrated in FIG. 2.

The assembly of the socket head pin 104 and the central drive gear 100, in which the pin is anchored, are mounted to the second hub plate 70 by means of an undercut 108 in the end 106 of the pin where it protrudes through the plate 70. The pin and central gear assembly are held in place by a set screw 110 extending in to the undercut recess 108 from an edge of hub plate 70 as best seen in FIG. 3. The hub plate 70 must be thick enough to at least equal the thickness of the wheel plate 24 which is captured by the locking arms. In the plate illustrated in FIG. 3 the plate 70 has the proper thickness in the outer portions where the threaded pins, such as 94 are positioned. However the center portion of the plate is illustrated as a thinner center portion 112 which is mounted in and attached, as by welding, at the center of the hub plate 70.

As the structure is now fully described it is evident that the present invention provides a mechanism by which a wheel can be quickly and reliably mounted and dismounted to a hub. One particular feature of the hub of the present invention is that there are no exposed threads which can be stripped as the wheel is mounted or dismounted or as tools are used in the mounting or dismounting of the wheel.

One simple tool suffices to activate all of the socket head bolts of the mechanism. The single tool is used to move the central rotary gear and also to loosen, as well as to tighten, each of the socket head cap bolts which lock the C clamps in their extended positions.

It will be realized that the mechanism of importance relative to the present invention is that on the outer surface of the plate 42, i.e., to the left of plate 42 in FIG. 3. It is this portion of the mechanism which is submitted to be novel and inventive. The portion to the right of plate 42 serves only to mount and anchor the mechanism to an axle. It will be realized that the present mechanism as described above may be used and combined with a wide variety of axles. The axles with which the novel mechanism may be used and the means by which it may be mounted to an axle for use therewith can vary extensively and can include both new manufacture as well as retro fit applications.

What is claimed and sought to be protected by Letters Patent of the United States is as follows:

1. A mechanism for rapid mounting and dismounting of a wheel to and from an axle which comprises,
    a hub adapted to be mounted to the end of said axle,
    said hub comprising, a first larger hub plate having a center opening and an inner and outer face; a second smaller circular hub plate mounted to the outer face of the first plate and having a center opening concentric with that of the first hub plate; gearing mechanism mounted on an outer face of said second hub plate; and mounting means attached to the inner face of said first hub plate for mounting said hub to an axle, said first hub plate having a plurality of uniformly spaced, internally threaded hub studs anchored in the outer face of an outer hub portion of said first hub plate, each of said hub studs having a socket head cap bolt threadably engaged therein, each such socket head cap bolt having a threaded inner end, an enlarged outer socket containing head, and a narrowed mid section adapted to receive a locking C clamp of a locking arm, the gear mechanism on the outer face of said second hub plate comprising a central drive gear and a plurality of end geared locking arms adapted to be extended and to be retracted in response to motion of said central drive gear, each such locking arm being pivotally mounted to said second hub plate; being geared at its inner end to mesh with the central drive gear; having a C clamp locking means formed at its extendable outer end; and having a profile in its retracted position which fits within that of the second hub plate, the central drive gear being mounted by a socket head pin for rotation in the center opening of the second hub plate whereby rotation of a tool in said socket causes rotation of said drive gear and causes, in turn, pivoting of said plurality of locking arms into their extended or into their retracted positions, which gearing mechanism, in its retracted position, is adapted to receive and cooperate with a wheel plate having a plurality of spaced openings corresponding, in numbers and spacing, to the socket head cap lock bolts threadably engaged in said hub studs whereby a wheel plate mounted on said hub may be secured thereto by pivoting of said locking arms to bring the C clamps into engagement with the mid-section of the lock bolts, and by the clamping of the C clamps into place by tightening of the individual socket heads of said lock bolts onto said C clamps.

2. The mechanism of claim 1 in which the exterior of the shaft end tapers inwardly toward its end and the sleeve has a conforming interior taper.

3. The mechanism of claim 1 in which the first hub plate is circular.

4. The mechanism of claim 1 in which there four hub studs spaced uniformly about the outer portion of the first hub plate.

5. The mechanism of claim 1 in which the locking arms are arcuate.

6. The mechanism of claim 1 in which the socket heads of the bolts are adapted to receive hex head tools.

7. The mechanism of claim 1 in which the locking arms are threadably mounted to the second hub plate.

8. The mechanism of claim 1 in which the locking arms are threadably mounted to the second hub plate by a left hand thread.

9. The mechanism of claim 1 in which the central drive gear is mounted to said head pin and said socket head pin is anchored in the central opening of said second hub plate by a threaded set pin.

10. A mechanism for rapid mounting and dismounting of a wheel to and from an axle which comprises, a hub adapted to be mounted to the end of said axle, said hub comprising, a first larger hub plate having a center opening and an inner and outer face; a second smaller circular hub plate mounted to the outer face of the first plate and having a center opening concentric with that of the first hub plate; gearing mechanism mounted on an outer face of said second hub plate; and a mounting sleeve attached to the inner face of said first hub plate, said sleeve being adapted to be slidingly engaged with and anchored to said axle end to rotatably support said hub plates and gear mechanism from said axle end, said first hub plate having a plurality of uniformly spaced, internally threaded hub studs anchored in the outer face of an outer hub portion of said first hub plate, each of said hub studs having a socket head cap bolt threadably engaged therein, each such socket head cap bolt having a threaded inner end, an enlarged outer socket containing head, and a narrowed mid section adapted to receive a locking C clamp of a locking arm, the gear mechanism on the outer face of said second hub plate comprising a central drive gear and a plurality of end geared locking arms adapted to be extended and to be retracted in response to motion of said central drive gear, each such locking arm being pivotally mounted to said second hub plate; being geared at its inner end to mesh with the central drive gear; having a C clamp locking means formed at its extendable outer end; and having a profile in its retracted position which fits within that of the second hub plate, the central drive gear being mounted by a socket head pin for rotation in the center opening of the second hub plate whereby rotation of a tool in said socket causes rotation of said drive gear and causes, in turn, pivoting of said plurality of locking arms into their extended or into their retracted positions, which gearing mechanism, in its retracted position, is adapted to receive and cooperate with a wheel plate having a plurality of spaced openings corresponding, in numbers and spacing, to the socket head cap lock bolts threadably engaged in said hub studs whereby a wheel plate mounted on said hub may be secured thereto by pivoting of said locking arms to bring the C clamps into engagement with the mid-section of the lock bolts, and by the clamping of the C clamps into place by tightening of the individual socket heads of said lock bolts onto said C clamps.

11. The mechanism of claim 1 in which the exterior of the shaft end tapers inwardly toward its end and the sleeve has a conforming interior taper.

12. The mechanism of claim 1 in which the first hub plate is circular.

13. The mechanism of claim 1 in which there four hub studs spaced uniformly about the outer portion of the first hub plate.

14. The mechanism of claim 1 in which the locking arms are arcuate.

15. The mechanism of claim 1 in which the socket heads of the bolts are adapted to receive hex head tools.

16. The mechanism of claim 1 in which the locking arms are threadably mounted to the second hub plate.

17. The mechanism of claim 1 in which the locking arms are threadably mounted to the second hub plate by a left hand thread.

18. The mechanism of claim 1 in which the central drive gear is mounted to said head pin and said socket head pin is anchored in the central opening of said second hub plate by a threaded set pin.

19. A device for removably securing a first plate to a second plate, said first plate having a center hole and at least one other hole spaced from said center hole, said second plate having an outer face and at least one extension means projecting therefrom, said device comprising:
- a rotatable gear means operatively mounted to said second plate, said rotatable gear means including turning means proximate its center whereby the gear can be rotated by an external force, and
- at least one rotatable hook means also operatively mounted to said second plate, said hook means being pivotable about a point exterior to the diameter of said rotatable gear means, said hook means having a top hook-shaped portion and a bottom portion, said bottom portion having an exterior toothed portion, said toothed portion being meshed with said rotatable gear means,
- whereby said first plate can be mounted to said second plate by engaging said extension means of the second plate with said other hole of the first plate and having the center hole of the first plate in line with the turning means of the gear means, applying an external force to the turning means and thereby rotating the gear means, rotation of said gear means causing the hook means to rotatably pivot whereby the hook-shaped portion can engage the extension means and sandwich the first plate between itself and the second plate thereby removably securing the first plate to the second plate.

20. The device of claim 19 wherein said extension means has an outer end spaced from said face and a stop means extends outwardly from said outer end, said stop means serving to stop movement of said hook means away from said face when said hook means is engaged with said extension means.

* * * * *